United States Patent [19]

Burnand

[11] Patent Number: 4,872,333
[45] Date of Patent: Oct. 10, 1989

[54] WIRE DRAWING DIE

[76] Inventor: Richard P. Burnand, 39 Constantia Avenue, Alan Manor, Johannesburg, Transvaal, South Africa

[21] Appl. No.: 849,549

[22] Filed: Apr. 8, 1986

[30] Foreign Application Priority Data

Apr. 9, 1985 [ZA] South Africa .................. 85/2607

[51] Int. Cl.⁴ .............................................. B21C 3/02
[52] U.S. Cl. ...................................... 72/467; 75/243; 501/90
[58] Field of Search ....... 72/467; 76/107 A, DIG. 12; 501/90, 99; 51/308, 309; 75/243

[56] References Cited

U.S. PATENT DOCUMENTS

| | | | |
|---|---|---|---|
| 2,941,248 | 6/1960 | Hall . | |
| 3,239,321 | 3/1966 | Blainey et al. . | |
| 3,831,428 | 8/1974 | Wentorf, Jr. et al. | 76/107 A |
| 3,912,500 | 10/1975 | Vereschagin et al. | 51/309 |
| 3,913,280 | 10/1975 | Hall | 51/308 |
| 3,944,398 | 3/1976 | Bell | 51/307 |
| 3,982,911 | 9/1976 | Lee | 51/307 |
| 3,999,962 | 12/1976 | Drui et al. | 51/307 |
| 4,124,401 | 11/1978 | Lee et al. | 501/90 |
| 4,151,686 | 5/1979 | Lee et al. | 264/332 |
| 4,231,195 | 11/1980 | DeVries et al. | 51/307 |
| 4,241,135 | 12/1980 | Lee et al. | 51/308 |
| 4,483,892 | 11/1984 | Ohno | 264/60 |
| 4,505,746 | 3/1985 | Nakai et al. | 72/467 |
| 4,534,773 | 8/1985 | Phaal et al. | 51/308 |

FOREIGN PATENT DOCUMENTS

| | | | |
|---|---|---|---|
| 569353 | 8/1977 | U.S.S.R. | 72/467 |
| 997352 | 7/1960 | United Kingdom . | |
| 2158086 | 11/1985 | United Kingdom . | |

OTHER PUBLICATIONS

Bullen, G. J., "The Effect of Temperature and Matrix on the Strength of Synthetic Diamond", *Industrial Diamond Review,* Oct. 1975, pp. 363-365.

*Primary Examiner*—Daniel C. Crane
*Attorney, Agent, or Firm*—Curtis, Morris & Safford

[57] ABSTRACT

A wire drawing die is provided which is characterized by containing a particular thermally stable diamond compact through which a hole is formed for receiving the wire to be drawn therethrough. The thermally stable diamond compact, which preferably has a hexagonal or circular shape in plan, comprises a mass of diamond particles present in an amount of 80 to 90 percent by volume of the compact and a second phase present in an amount of 10 to 20 percent by volume of the compact, the mass of diamond particles containing substantial diamond-to-diamond bonding to form a coherent, skeletal mass and a second phase consisting essentially of silicon, the silicon being in the form of silicon and/or silicon carbide.

4 Claims, 1 Drawing Sheet

4,872,333

WIRE DRAWING DIE

BACKGROUND OF THE INVENTION

This invention relates to wire drawing dies.

One type of wire drawing die consists of a cemented carbide ring enclosing an abrasive compact to which it is bonded. A hole extending axially through the abrasive compact is provided and the wire to be drawn is pulled through this hole. In use, the cemented carbide support ring is held in a metal surround.

The abrasive compacts which are used in such dies are known in the art and consist essentially of a mass of abrasive particles present in an amount of at least 70 percent, preferably 80 to 90 percent, by volume of the compact bonded into a hard conglomerate. Compacts are polycrystalline masses and can replace single large crystals in many applications. The abrasive particles of compacts are invariably ultra-hard abrasives such as diamond and cubic boron nitride.

The abrasive compacts which have generally thus far been used in wire drawing dies contain a second phase or bonding matrix which contains a catalyst (also known as a solvent) useful in synthesising the particles. In the case of cubic boron nitride, examples of suitable catalysts are aluminium, or an alloy of aluminium with nickel, cobalt, iron, manganese or chromium. In the case of diamond, examples of suitable catalysts are metals of Group VIII of the Periodic Table such as cobalt, nickel or iron or an alloy containing such a metal.

SUMMARY OF THE INVENTION

According to the present invention, there is provided a wire drawing die comprising a thermally stable diamond compact held in a supporting surround and having a hole through it capable of receiving wire to be drawn therethrough, the compact comprising a mass of diamond particles present in an amount of 80 to 90 percent by volume of the compact and a second phase present in an amount of 10 to 20 percent by volume of the compact, the mass of diamond particles containing substantial diamond-to-diamond bonding to form a coherent, skeletal mass and a second phase consisting essentially of silicon, the silicon being in the form of silicon and/or silicon carbide.

DETAILED DESCRIPTION OF THE INVENTION

Figure 1:
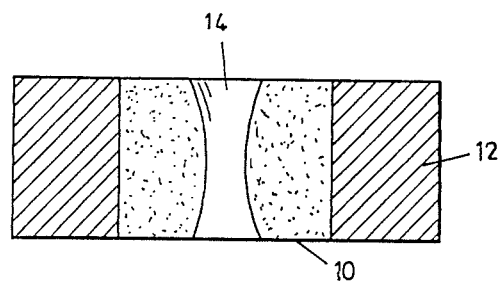
FIG. 1 is a sectional side view of an embodiment of a wire drawing die of the invention.

The essential feature of the wire drawing die of the invention is that the diamond compact is a particular thermally stable diamond compact. The diamond compact is one which will withstand a temperature of 1200° C. under a vacuum of $10^{-4}$ Torr or better or in an inert or reducing atmosphere without significant graphitisation of the diamond occurring. The compact and its method of manufacture is described in a British patent application published Nov. 6, 1985, under the number 2158086A, the disclosure of which is incorporated herein by reference. It is to be noted that in the compact, the second phase consists essentially of silicon, the silicon being in the form of silicon and/or silicon carbide. This means that any other components will be present in the second phase in trace amounts only.

These thermally stable diamond compacts are manufactured using temperatures and pressures in the diamond stable region of the carbon phase diagram. The compacts may, for example, be produced by placing a mass of diamond particles in a reaction vessel, placing a mass of silicon in contact with the mass of diamond particles, placing the loaded reaction vessel in the reaction zone of a high temperature/high pressure apparatus, subjecting the contents of the reaction vessel to conditions of elevated temperature and pressure in the diamond stable region of the carbon phase diagram for a time sufficient to produce the compact and recovering the compact from the reaction zone. The preferred elevated conditions of temperature and pressure are temperatures in the range 1400° to 1600° C. and pressures in the range 50 to 70 kilobars. These elevated conditions of temperature and pressure will be maintained for a time sufficient to produce a compact. Typically these elevated conditions of temperature and pressure are maintained for a period of 5 to 20 minutes. The silicon may be provided in the form of a powder, or in the form of a sheet or foil. The compact which is produced not only has thermal stability but also substantial diamond-to-diamond bonding which is primarily physical diamond-to-diamond interlocking and bonding created by plastic deformation of the diamond particles during manufacture of the compact.

The reaction vessel in which the diamonds and silicon are placed may be made of molybdenum, tantalum, titanium or like high melting, carbide forming metal. It is believed that confining the mass of diamond and silicon within such reaction vessel during manufacture contributes to the excellent diamond-to-diamond bonding which is achieved.

The diamond particles used in the manufacture of the insert are preferably fine particles having a particle size of less than 100 microns. Typically, a particle size of 10 to 75 microns will be used with the preferred range being 15 to 30 microns. The diamond particles may be natural or synthetic, preferably natural.

High temperature/high pressure apparatus is well known in the art—see for example, U.S. Pat. No. 2,941,248.

The wire drawing die is of conventional construction save for the fact that the compact is a thermally stable compact as described in a British patent application published Nov. 6, 1985, under the number 2158086A. Thus, the supporting surround may be made of any suitable material known in the art such as metal, alloy, cemented carbide or the like. When metal or alloy is used, the diamond compact will usually be placed in a mass of the powdered metal or alloy in a suitable mould and the temperature is then raised to cause the metal or alloy to deform plastically and sinter. On cooling the metal or alloy forms a surround for the compact to which it is firmly bonded. The metals or alloys which are desirably used for the surround have a melting temperature above 800° C. and this makes their use for diamond compacts containing a solvent matrix hazardous.

The thermal stability of the compact which is used in the present invention enables these high melting metals or alloys to be used under ambient pressure conditions without fear that any significant graphitisation of the diamond will occur. Any graphitisation of the diamond has the detrimental effect of weakening the compact.

The thermal stability of the compact also allows for wire to be drawn through hot. This is of particular importance to the drawing of tungsten and molybdenum wires which must be drawn hot.

It has further been found that the thermally stable compact allows for fine finishes to be produced on the wires which are drawn therethrough. A fine, smooth finish on drawn wire is desirable for many applications.

An embodiment of a wire drawing die of the invention is illustrated by FIG. 1. Referring to this Figure, there is shown a wire drawing die comprising a thermally stable diamond compact 10 mounted in a surround 12 of a high melting alloy. Provided axially through the compact is a hole 14 through which wire may be drawn. Examples of high melting alloys are:

| Alloy    | Parts by Weight |
|----------|-----------------|
| Cu/Ag/Zn | 38/27/30        |
| Cu/Sn    | 85/15           |
| Fe/Cu/Sn | 60/32/8         |

Figure 2:
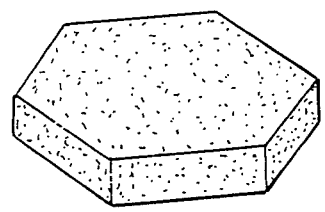
FIG. 2 is an embodiment of a compact for use in the wire drawing die of FIG. 1.
Figure 3:
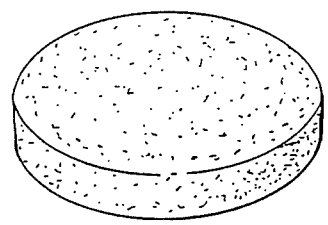
FIG. 3 is another embodiment of a compact for use in a wire drawing die of FIG. 1.

FIGS. 2 and 3 illustrate examples of particularly suitable shapes of the compacts used in the invention. FIG. 2 illustrates a compact which is hexagonal in plan, while FIG. 3 illustrates a compact which is circular in plan.

I claim:

1. A wire drawing die comprising a thermally stable diamond compact held in a supporting surround and having a hole through it capable of receiving wire to be drawn therethrough, the compact being resistant to significant graphitization resulting from integration with the supporting surround at ambient pressure conditions, the compact comprising a mass of diamond particles present in an amount of 80 to 90 percent by volume of the compact and the remainder as a second phase present in an amount of 10 to 20 percent by volume of the compact, the mass of diamond particles containing substantial diamond-to-diamond bonding to form a coherent, skeletal mass and a second phase consisting essentially of silicon, silicon carbide or a combination thereof.

2. A wire drawing die according to claim 1 wherein the surround is made of a metal or alloy having a melting point above 800° C.

3. A wire drawing die according to claim 1 wherein the diamond particles are natural diamond.

4. A wire drawing die according to claim 1, wherein any components other than the mass of diamond particles and the silicon, silicon carbide, or combination thereof, are present in trace amounts only.

* * * * *